UNITED STATES PATENT OFFICE.

ROBERT E. BRIGHT, OF CHICAGO, ILLINOIS, ASSIGNOR TO STEIN-HALL MANUFACTURING COMPANY, A CORPORATION OF DELAWARE.

STARCH-CONVERSION PRODUCT.

1,411,203. Specification of Letters Patent. Patented Mar. 28, 1922.

No Drawing. Application filed February 7, 1921. Serial No. 443,243.

*To all whom it may concern:*

Be it known that I, ROBERT E. BRIGHT, a citizen of the United States, residing at Chicago, in the county of Cook and State of Illinois, have invented a certain new and useful Improvement in Starch-Conversion Products, of which the following is a full, clear, concise, and exact description.

My invention relates to a starch conversion product comprising a plurality of sugars, which is useful for many purposes in the art, and particularly as an addition agent to flour, enabling bakers to produce bread and other flour products of superior character in an economical manner.

I have found that by subjecting suitable starches or starch bearing materials to the action of heat and a chemical, or chemicals, a series of degradation, or conversion, products ranging from unaltered starch, through the intermediate products of amylolysis to starch sugars is produced, which products when treated with water have the same fluidity and viscosity with a relatively small amount of water, say two parts, as is acquired by starch upon the addition of a relatively large amount of water, say approximately fifteen parts. In the form which I at present prefer, the product is a dry, or substantially dry, compound containing approximately thirteen per cent of starch; sixty-two per cent of the intermediate products of amylolysis, which may include such substances as tetra-amylose and hexa-amylose; thirteen per cent of starch sugars, such as maltose, dextrose, iso-maltose, fructose and raffinose, and 0.4 per cent of free acid, together with smaller amounts of other ingredients. This dry, white product, may be suitably mixed with wheat, or other flour, in varying proportions. It is feasible to employ as much as thirty parts of my improved product to seventy parts of the other flour used. By employing such combination of flour and said product, there results a bread of very fine texture and firm golden-brown crust; furthermore, the combination yields a loaf approximately one-third larger and of far better flavor and keeping qualities than when flour alone is used. The sugars referred to above, which are contained in my improved product, are of several types known respectively as monosaccharides, disaccharides, trisaccharides, etc. As an example of the monosaccharides, I may cite dextrose; as an example of the disaccharides, I may cite maltose; and as an example of the trisaccharides, I may cite raffinose; all which may be present in my improved product.

Of the foregoing sugars, the monosaccharides (e. g. dextrose, fructose, etc.) are the only readily fermentable sugars present, it being necessary to first reduce all of the polysaccharides to monosaccharides before they may be fermented. It thus follows that in a composition of starch sugars, such as the improved product of my invention, the yeast when brought into contact with the dough containing my improved product, forthwith commences to convert the monosaccharides into carbon dioxide and alcohol. During this time the enzymes of the yeast are splitting the polysaccharides into monosaccharides, or simple sugars, so that when the evolution of gas resulting from the action of the yeast upon the monosaccharides, has reached its maximum, a new volume of gas due to the action of the yeast upon the monosaccharides produced by breaking up the polysaccharides, is provided and the dough is thus prevented from receding or "falling", as it would if simple sugar alone were present in the first instance.

By this means I am enabled to supply a suitable volume of gas to the dough at a relatively uniform rate, over a relatively prolonged period of time, from the successive action of the yeast enzymes upon the several sugars. The bread, therefore, remains in a completely expanded condition until the yeast enzymes are destroyed by the heat of the oven and the dough is expanded by the gas to a larger volume than it would ordinarily assume, thus resulting in a larger and lighter loaf. I am also enabled to dispense, either wholly or in part, with the addition of other sugar to the bread mixture.

It has been shown that the changes which occur during the aging of the bread are not due exclusively to the loss of water from the loaf. ("The Velocity of Staling of Bread, J. R. Katz, Univ. Amsterdam, Verslag, Akad, Wetenshappen, 23, 652–5, 1914,") ("The Cause of the Staling of the Crust of Bread and the Possibility of Preventing this Change. J. R. Katz. Z. Elektrochem., 19,665–7;") but rather, that the aging of bread is primarily due to the influence of loss of water on the colloid system starch-water; in view of the high concentration of starch, as starch paste, a very slight change in the water content exerts a considerable influence on the system. The water liberated by the separation of amorphous starch from the paste, is partly evaporated and partly absorbed by the albumen coagulum; a progressive separation of amorphous starch is thereby produced, and the staling of bread is essentially due to this coagulation of starch from the paste to the amorphous form. Manifestly, then, my improved product, which tends to render the liquifaction of the starch more complete, will also serve to retard the aging of the bread.

Furthermore, I have found the acidity of my improved product, which should not exceed about 2 per cent as a maximum, and which ordinarily is substantially less, is a very important factor in attaining valuable results. In the first place, it has a desirable effect upon the physical characteristics of the loaf produced. The degree to which dough can be extended, varies with the quantity and physical condition of the gluten, and within certain limits, it is possible to improve the raising quality of the dough by modifying the physical condition of the gluten. Increasing the acidity of the dough, as by the use of the present flour improver, increases its elasticity and tends to produce a larger loaf, resulting also, indirectly, in a finer and more silky texture of the crumb. In addition, the acidity performs a most important function in preventing the condition of bacterial decomposition in bread, known as "rope" or "ropiness", which leads to a peculiar slimy consistency of portions of the interior of the loaf. The existence of such a condition is effectively prevented by the use of my flour improver.

Further advantages attained by the use of my novel flour improver are the production of a whiter and finer-textured crumb, and better flavor; not to mention the saving of a substantial amount of wheat, or similar flour, corresponding to the proportion of flour improver used in the mixture.

For the sake of a concrete example illustrating one way in which my product may be manufactured in desirable form, details of a specific procedure within the scope of the broad invention will now be set forth. It is to be understood, however, that the invention is not limited to the precise details described but may be varied within the scope of the appended claims in which the invention is more particularly pointed out. Powdered starch, having no excessive moisture content, (say not in excess of 12%) is first acidulated, preferably with a dilute solution of chemically pure hydrochloric acid. The amount of the chemically pure hydrochloric acid used is preferably from 0.5 to 0.75 per cent of the weight of the starch to be treated, and this amount of the pure acid is diluted with water, before adding it to the starch, to give a solution of about 10° to 11° Baumé. After thoroughly mixing this dilute acid solution with the starch, the acidulated starch is then put into a steam-jacketed converter, provided with agitating means, and the temperature is raised to about 325° F. by means of steam at 75 to 80 pounds gage pressure, supplied to the converter jacket.

Heating and agitation of the acidulated starch at approximately 325° F. is continued for a period of time varying in practice from about one hour to one hour and fifteen minutes, or until a test sample of the product shows a water solubility of from 50 to 60 per cent, and a starch sugar content of about 12 to 13 per cent; a product answering to these identifying characteristics being particularly desirable for certain purposes. Where a lower or higher content of starch sugars, and a corresponding lower or higher degree of water solubility is sought, the time of treatment is correspondingly reduced or increased. A higher degree of solubility and a higher starch sugar content can also be obtained by increasing the amount of acid used and employing a higher treating temperature. In any case, the progress of the conversion, or degradation, of the starch is carefully observed by taking frequent test samples for examination and when the desired composition has been obtained, the heating is immediately stopped and the product is cooled as quickly as possible to say 140° F. or lower; after which it is bolted and packed in barrels and bags for shipment.

The product obtained in carrying out the process in accordance with the specific procedure above described, by way of a typical example, has the following composition, calculated on a dry basis:

| | Per cent. |
|---|---|
| Moisture | 5.6 |
| Unaltered starch | 15.4 |
| Intermediate products of amylolysis (such as tetra-amylose and hexa-amylose) | 62.1 |
| Starch sugars (such as maltose, dextrose, raffinose and other mono and poly-saccharides) | 12.8 |
| Proteins (N. 6.25) | 1.2 |
| Total acidity (as lactic acid) | 0.38 |
| Fat | 0.37 |
| Ash | 0.27 |
| Fibre | 0.48 |

My improved product, in one of its preferable forms, is a substantially dry, and substantially white product having a characteristic sweet-sour taste, an acid reaction, a water solubility of from 40 to 90 per cent, and containing a substantial amount of unaltered starch.

In employing the novel product for bread making, probably the best results are obtained when the flour mixture contains from 1 to 20 per cent of my said product, dry weight. The customary amount of yeast, yeast accelerator, fat, salt, water and other usual ingredients, may be used in the ordinary manner. The resultant bread, if properly proportioned as herein directed, presents the usual white appearance of ordinary white bread, but has additional valuable characteristics as hereinbefore explained.

I claim:

1. A substantially dry, starch degradation product adapted for use in improving dough, comprising mono- and poly-saccharide starch sugars, and polymers of amylose.

2. A sugar compound adapted for improving dough, comprising a plurality of starch degradation sugars adapted to successively yield gas to the dough when continuously acted upon by yeast enzymes.

3. A sugar compound adapted for improving dough, comprising a plurality of starch degradation sugars adapted to be successively subjected to the action of the enzymes in the yeast to yield gas to the dough at a predetermined rate, substantially up to the time at which the enzymic action is arrested.

4. A starch degradation product for use in improving dough, comprising a plurality of sugars which, under the influence of yeast enzymes, reach their points of maximum gas evolution, due to fermentation, at successive times.

5. A starch conversion product adapted for improving dough, having a water solubility of less than ninety per cent and comprising starch, intermediate products of amylolysis and mono- and polysaccharide starch sugars to the extent of at least six per cent.

6. A starch conversion product adapted for improving dough, comprising a substantially dry, substantially white product, having a water solubility of less than ninety per cent, containing intermediate products of amylolysis and mono- and polysaccharide starch sugars, and having an acid content of less than two per cent.

In witness whereof, I hereunto subscribe my name this 27th day of January A. D., 1921.

ROBERT E. BRIGHT.